3,023,194
NOVEL PHOSPHORUS COMPOUNDS AND PROCESS

Alexander Kowalski, Levittown, Pa., assignor to Pennsalt Chemicals Corporation, Philadelphia, Pa., a corporation of Pennsylvania
No Drawing. Filed Sept. 15, 1959, Ser. No. 839,989
12 Claims. (Cl. 260—79.3)

This invention relates to novel chemical compounds which contain nitrogen, phosphorus, and sulfur and which I name amidophosphazosulfamides.

It is an object of this invention to provide novel amides of trichlorophosphazosulfuryl chloride $$(Cl_3—P=N—SO_2Cl)$$

which amides are characterized by the structural grouping:

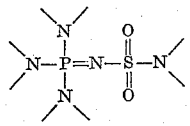

More specifically, it is an object of this invention to provide novel amides having the structure

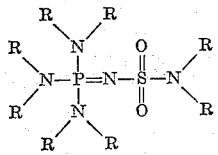

where R is a member selected from the group consisting of H, alkyl, aryl and —$R_1$—$NH_2$ radicals wherein $R_1$ is selected from the group consisting of alkylene and arylene radicals. It is also an object of this invention to provide novel polymers obtained from the above amides. A further object is to provide novel phosphorus-containing polymers which have surprisingly high thermal stability. A still further object of this invention is to provide novel processes for the manufacture of these compounds and to advance the art of phosphorus chemistry.

In a preferred embodiment of this invention, trichlorophosphazosulfuryl chloride is reacted with ammonia to yield triamidophosphazosulfamide

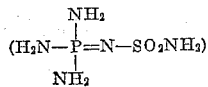

Trichlorophosphazosulfuryl chloride is an old compound whose preparation is given by Kirsanov in Zhur. Obshchei Khim. 22 88 (1952.) The reaction to obtain triamidophosphazosulfamide is preferably carried out by passing anhydrous ammonia gas into an inert organic solvent solution of trichlorophosphazosulfuryl chloride at temperatures between about 0° and 80° C. Lower temperatures can be used, however; for example, the reaction can be carried out in liquid ammonia. Useful solvents for the preferred process include the hydrocarbon solvents such as benzene, toluene, petroleum ether, solvent naphtha, but other solvents can be used (e.g., diethyl ether, methylene chloride, ortho-dichlorobenzene, and the like). As the ammonia is passed into the reaction medium, an exothermic reaction occurs and, if desired, the reaction mass may be heated to about 75° C. to 85° C. to speed completion of the reaction. The reaction products precipitate from the organic solvent medium as white solids and comprise a mixture of triamidophosphazosulfamide and by-product ammonium chloride. Complete separation of the ammonium chloride from the amide is somewhat difficult and is best done by vacuum sublimation at relatively low temperatures, i.e., at about 80° to 200° C. at very high vacuum, say in the micron range to 1 mm. Hg pressure. Because loss of ammonia from the phosphazosulfamide may occur at the higher temperatures, the lower sublimation temperatures are preferred. Vacuum sublimation with an entrainer (e.g., air, nitrogen, argon) is also useful to make the separation (see vol. IV, Techniques of Organic Chemistry, ch. VII, pages 603–645, Interscience 1951, edited by A. Weissberger).

The product triamidophosphazosulfamide is a white solid, soluble in water and liquid ammonia, slightly soluble in methanol and insoluble in other common organic solvents (e.g., diethyl ether, benzene, acetone, etc.).

In lieu of using ammonia to react with the trichlorophosphazosulfuryl chloride, primary and secondary organic amines may be used to give analogous products. The novel compositions thus formed will have the structure as above defined where the R groups represent the substituents on the nitrogen atom of the amine used. In this case at least one of the R groups on each of the nitrogen atoms will be alkyl, aryl or —$R_1$—$NH_2$ where $R_1$ is defined above. Thus, lower aliphatic amines may be used, such as methyl amine, dimethylamine, n-propylamine, di-n-propylamine, di-isopropylamine, n-butylamine, di-iso-butylamine, and the like. Also operable are the longer chain amines such as hexadecylamine, octadecylamine, didecylamine, and the like. Primary and secondary aromatic amines are also reactive with trichlorophosphazosulfuryl chloride and those useful include aniline, the toluidines, the xylidenes, N-methylaniline, N-ethylaniline, 4-aminodiphenyl, α- and β-naphthylamine, and the like. Aliphatic and aromatic polyamines may also be used such as ethylene diamine, trimethylenediamine, tetramethylenediamine, hexamethylenediamine, 1,2-propylenediamine, diethylenetriamine, 1,4-phenylenediamine and its position isomers, the isomeric diaminodiphenyls, and the like. It will be understood that the amines used to react with the trichlorophosphazosulfuryl chloride will be free of any substituent other than amino which will be reactive with the phosphazo chloride. The preferred amines are the hydrocarbon alkyl and aryl mono- and di-primary and secondary amines, but substituted amines such as halogeno, methoxy and nitro-substituted amines may be used. Useful examples of these latter amines are the isomeric chloroanilines, the anisidines, and the nitroanilines.

The process conditions for reaction of organic amines with the phosphazo chloride are similar to that described above when using ammonia, it being understood that if the amine used is not gaseous, it is first dissolved in an inert solvent before adding to the phosphazo chloride. It will also be understood that by using a mixture of amines, compounds may be obtained with different R groups in the molecule.

The preferred phosphazoamide of this invention is triamidophosphazosulfamide and this compound is of parcular value as an intermediate to a thermally stable polymer. This polymer is readily obtained by heating the triamidophosphazosulfamide at about 100° to about 150° C. until the evolution of ammonia ceases. In this way the phosphazosulfamide undergoes condensation, splitting out ammonia from two —$NH_2$ groups and forming polymer. Additional intramolecular condensation by further elimination of $NH_3$ from the remaining —$NH_2$ groups causes cross-linking. Pure triamidophosphazosulfamide need not be used to obtain this polymer. It is sufficient to heat the mixture of the triamidophosphazosulfamide and ammonium chloride formed on reaction of the phosphazochloride with ammonia. In this way, ammonia is evolved and the polymeric triamidophosphazosulfamide can be separated by water washing or by volatilizing the ammonium chloride.

The polymeric triamidophosphazosulfamide is a white amorphous solid which is insoluble in water, in liquid ammonia, and in organic solvents. The polymer is stable to temperatures up to at least about 500° F. (250° C.) at which point it begins to decompose. This product finds particular use in high temperature applications. For example, this temperature stable polymer may be pressed into films which are useful gasket materials for equipment and machinery used at temperatures up to at least about 500° F.

An alternate procedure for preparing this polymer involves simply heating at 80° to 200° C. a mixture of ammonium chloride and trichlorophosphazosulfuryl chloride. In this reaction, HCl gas is evolved and the solid product is leached with water to remove excess ammonium chloride. The white, water-insoluble polymer has the same properties as the polymer obtained by heating triamidophosphazosulfamide.

It is quite surprising that the polymeric triamidophosphazosulamide is thermally stable in view of the thermal behavior of the analogous amides of this invention which are obtained from organic amines. When these organic amine derivatives are heated, they decompose at temperatures between 150° C. and 200° C.; furthermore, they do not yield thermally stable polyamides.

However, these organic amine derivatives have valuable properties and are useful in themselves for several purposes. For example, the reaction products of trichlorophosphazosulfuryl chloride and a diamine (e.g., ethylene diamine) are polymeric products which yield fibers. Many of the organic amine derivatives evolve strong odors on heating and thus may be used in temperature warning systems, leak detection systems and the like. Furthermore, the novel compounds are intermediates useful to advance the art of phosphorus chemistry.

The following examples are given in order to more specifically describe the invention.

*Example 1*

A solution of 9.7 parts of trichlorophosphazosulfuryl chloride ($Cl_3PNSO_2Cl$) in 435 parts of benzene is prepared and anhydrous gaseous ammonia is passed into the solution at room temperature for 20 minutes. The flow of ammonia is continued as the temperature of the reaction mixture is raised to 80° C. over a one-hour period. The thick white slurry that forms is cooled to room temperature, filtered off, and vacuum dried at 70° C. The white product (14.8 parts) consists of a mixture of triamidophosphazosulfamide and ammonium chloride. Separation is effected by vacuum sublimation of the ammonium chloride at 85° to 100° C. and at a pressure of 1 to 10 microns Hg. The remaining white product, which is water soluble, is shown by analysis to contain 16.8% P and 18.6% S. Calculated values for $$(NH_2)_3PNSO_2NH_2$$

are 17.9% P and 18.5% S.

When the white product obtained above is heated at a temperature between 100° and 150° C. for 1 to 3 hours, ammonia is evolved and the white solid becomes water-insoluble. This water-insoluble polymer of triamidophosphazosulfamide is stable to at least 500° F.

*Example 2*

A solution of trichlophosphazosulfuryl chloride in petroleum ether is prepared. Then, a solution of n-butylamine in petroleum ether is slowly added with stirring until a stoichiometric excess of the amine is present. The reaction product consists of a mixture of white solids and a gummy material. The petroleum ether is removed by decanting and the residue is vacuum dried. The products are then washed with water and dilute hydrochloric acid several times to remove excess amine and amine hydrochloride. The solids dissolve, leaving a viscous liquid residue. This material is extracted with warm benzene and is then vacuum dried. The resulting phosphasosulfamide is a colorless, viscous liquid, insoluble in water and not attacked by acids or hot alkali.

*Example 3*

Tri(dimethylamido)phosphazo-N,N - dimethyl sulfamide is prepared by passing excess dimethylamine into a solution of $Cl_3PNSO_2Cl$ in benzene. The dimethylamine hydrochloride is filtered and the filtrate vacuum distilled. The yellow liquid product decomposes at 150° C.

*Example 4*

Example 2 is repeated except that ethylene diamine is used instead of n-butylamine. The products obtained consisted of a mixture of white solids and a pale yellow liquid suspended in the petroleum ether. The yellow liquid is separated and washed with petroleum ether. The resulting clear, yellow, viscous, water-soluble liquid is the phosphazoamide product. Upon heating, free amine is evolved and a tacky, resinous orange mass results which hardens on cooling. The tacky mass yields fibers on drawing.

*Example 5*

A solution of trichlorophosphazosulfuryl chloride in benzene is slowly added, with stirring, to a benzene solution containing a stoichiometric excess of aniline. The white solid aniline hydrochloride that precipitates is filtered off and the benzene filtrate is shaken with water. The waxy solid that precipitates is removed, washed well with water and recrystallized from acetone. The pale yellow crystals melt at 175° to 180° C., decompose at 200° C., are insoluble in water and stable to alkali. Elemental analyses show four aniline substituents, thus confirming the structure $(C_6H_5NH)_3PNSO_2NHC_6H_5$.

As many different embodiments of this invention may be made without departing from the spirit and scope thereof, it is to be understood that this invention is not limited to the specific embodiments thereof except as defined in the appended claims.

I claim:
1. Triamidophosphazosulfamide.
2. A condensation homopolymer of triamidophosphazosulfamide obtained by heat and the elimination of ammonia.
3. A process for making triamidophosphazosulfamide which comprises passing anhydrous gaseous ammonia into a solution of trichlorophosphazosulfuryl chloride in an inert organic solvent, said reaction occurring at a temperature between about 0° and 80° C.
4. A process for making a condensation homopolymer of triamidophosphazosulfamide which comprises heating triamidophosphazosulfamide at a temperature between about 100° C. and about 150° C.
5. A process for making phosphazosulfamides which comprises reacting with trichlorophosphazosulfuryl chloride in an inert organic solvent at a temperature between about 0° and 80° C., a nitrogen compound taken from the group of ammonia, primary organic amines, and secondary organic amines, said organic amines containing from one to twenty carbon atoms.
6. Novel phosphazosulfamides having the structural formula

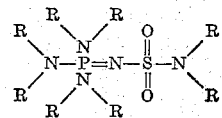

where each R is a member selected from the group consisting of hydrogen, alkyl and aryl radicals containing from one to twenty carbon atoms.

7. A phosphazosulfamide as in claim 6 wherein R is an alkyl radical.

8. A phosphazosulfamide as in claim 6 wherein R is a lower alkyl radical.

9. A phosphazosulfamide as in claim 6 wherein R is a methyl radical.

10. A phosphazosulfamide as in claim 6 wherein R is a butyl radical.

11. A phosphazosulfamide as in claim 6 wherein R is an aryl radical.

12. A phosphazosulfamide as in claim 6 wherein R is phenyl.

References Cited in the file of this patent

Kirsanov: Zhur. Obshchei Khim., vol. 22, page 88 (1952).

Brewster: "Organic Chemistry," page 300, 2nd ed. (1953), Prentice Hall.

"Organo Phosphorus Compounds," page 278, John Wiley & Sons, N.Y., 1950.